No. 659,190. Patented Oct. 2, 1900.
C. H. BAGOT & D. DISHART
COUPLING FOR RAILWAY OR SIMILAR VEHICLES.
(Application filed June 4, 1900.)
(No Model.) 2 Sheets—Sheet 1.
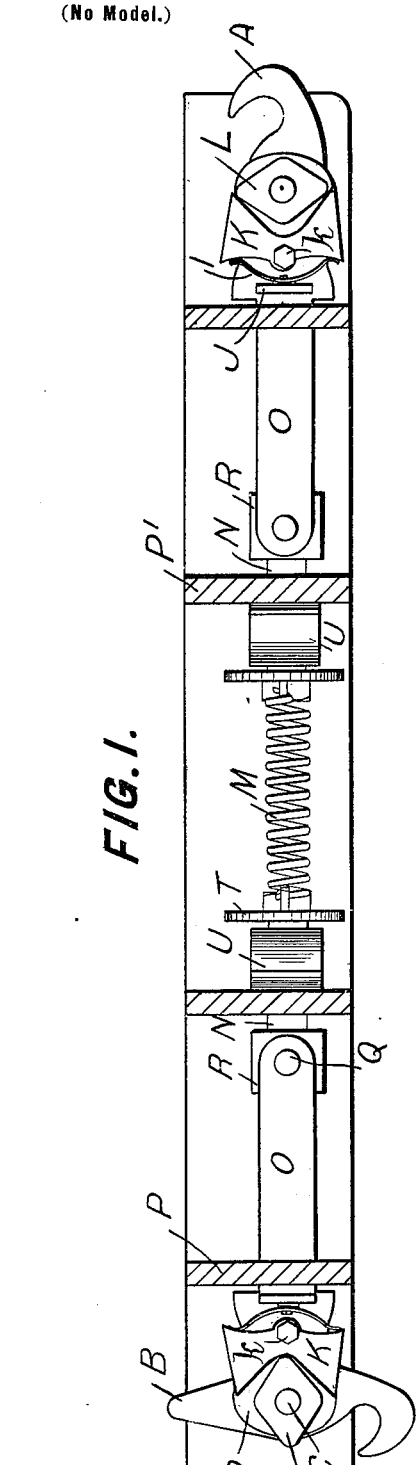
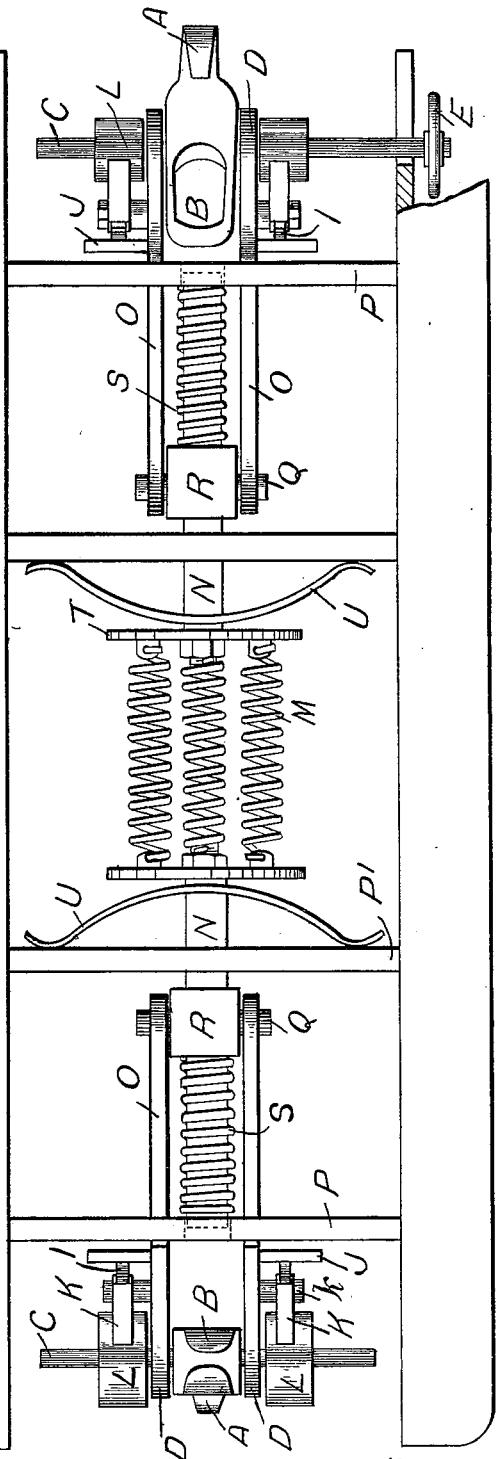
FIG.1.
FIG.2.
WITNESSES
INVENTORS
C. H. Bagot & D. Dishart.
by Mason, Fenwick & Lawrence attys.

No. 659,190. Patented Oct. 2, 1900.
C. H. BAGOT & D. DISHART.
COUPLING FOR RAILWAY OR SIMILAR VEHICLES.
(Application filed June 4, 1900.)
(No Model.) 2 Sheets—Sheet 2.
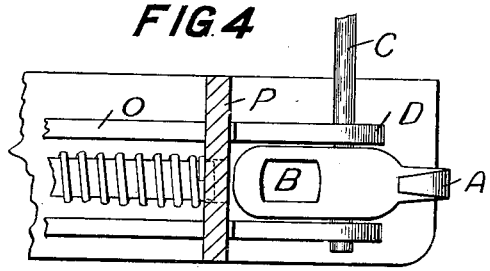
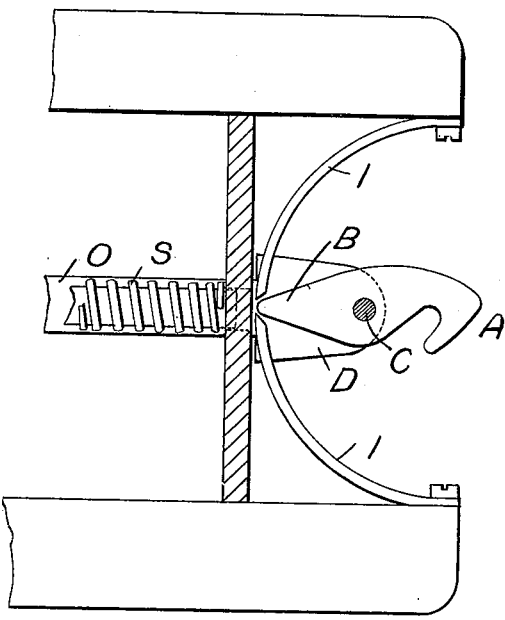
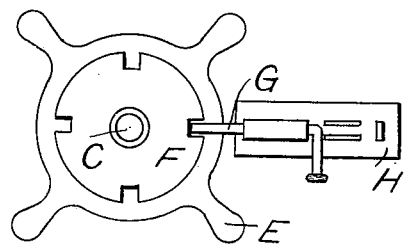

UNITED STATES PATENT OFFICE.

CHARLES HENRY BAGOT, OF EGREMONT, AND DAVID DISHART, OF SUNDERLAND, ENGLAND.

COUPLING FOR RAILWAY OR SIMILAR VEHICLES.

SPECIFICATION forming part of Letters Patent No. 659,190, dated October 2, 1900.

Application filed June 4, 1900. Serial No. 19,071. (No model.)

*To all whom it may concern:*

Be it known that we, CHARLES HENRY BAGOT, residing at Egremont, in the county of Chester, and DAVID DISHART, residing at Sunderland, in the county of Durham, England, (whose post-office addresses are 78 Clarendon road, Egremont, and 11 Pemberton street, Sunderland,) subjects of the Queen of Great Britain, have invented certain new and useful Improvements in Couplings for Railway or Similar Vehicles, of which the following is a specification.

This invention has for its object to provide a simple and efficacious coupling for railway and similar wagons, carriages, and vehicles.

The invention consists, essentially, in mounting on each end of the vehicles to be coupled a combined hook and link consisting of a coupling-piece having one half formed as a hook and the other half as a link, which coupling-piece is revolubly mounted at the vehicle ends in such a way that it may be turned to bring either the hook or the link into the outward or operative position, as required, for effecting the coupling or to uncouple the vehicles.

The invention also comprises means for rendering the coupling automatic in its action and an arrangement of draw-bar springs adapted to reduce vibration or oscillation, and thus render the coupling secure in action, and means for locking the coupling in its several positions.

The invention will be described with reference to the accompanying drawings, in which—

Figure 1 is a sectional elevation, and Fig. 2 a plan, of the improved coupling as connected to the draw-bar of a vehicle and showing the means for preventing vibration or oscillation. Fig. 3 is an elevation of the locking means. Fig. 4 is a sectional elevation, and Fig. 5 a plan, of the coupling-piece mounted on a vertical shaft.

Referring to the drawings, A B, Figs. 1 and 2, designate the coupling-piece or combined hook and link, of which one half is formed as a hook A and the other half as a link B, a similar coupling-piece being mounted at each end of the vehicle on a cross-bar or shaft C, passing through the coupling-piece A B between the hook and link. The shaft C is revolubly mounted in a convenient manner, according to the kind of vehicle, such as in brackets D, which may be formed on or attached to the draw-bar of the vehicle, and is provided at either or both ends, extended to the side of the vehicle, with a hand-wheel E or a lever or other means of rotating or turning it to bring the coupling-piece into the required position for coupling or uncoupling. Suitable means may be provided for locking the coupling, such as a disk F, Fig. 3, which may be fixed on either or both ends of the shaft C, and is provided with notches, slots, or recesses, into any one of which a bolt G may be shot. This bolt may be conveniently mounted on the end of an arm H, carried by the bracket D, which supports the shaft C.

In order to render the actual coupling automatic, an arrangement of springs, such as I, Figs. 1 and 2, is provided to hold the coupling-pieces in the operative position with sufficient yield to allow the hooks and links of the respective couplings to snap into engagement upon the vehicles meeting, the engaging ends of the coupling-pieces being provided with beveled or inclined faces, so as to ride up one on the other until they snap into engagement. These springs I must be arranged to allow of the shaft C being fully rotated when required, so that either the hook A or link B of the coupling-piece may be turned into the operative position, according as to whether the other vehicle is approaching with its link or its hook ready for engagement. For this purpose the springs I, which are shown fixed on arms J on the brackets D, may be arranged to bear on intermediate pieces K, pivoting on studs *k*, and which bear against cam-pieces L, fixed on the shaft C. The cam-pieces L are formed, for instance, with four corners, as shown, and the intermediate pieces K are suitably shaped or recessed to receive said corners in succession as the shaft and cam-pieces are turned, whereby owing to the pressure of the springs I tending to return the piece K always to the vertical or normal position the cam-pieces L, and therewith the shaft C, are always compelled to take up a position in which the coupling-piece A B lies either vertically or horizontally. By this means while the coupling-piece A B can always be turned completely by the hand-wheel E it is held with sufficient spring action when in the operative position to allow of the coupling-piece yielding and snapping automatically into engagement with its corresponding coupling-piece upon two vehicles meeting.

The shafts C are preferably arranged transversely across the vehicle ends, as shown in Figs. 1 and 2; but it is obvious that this is not essential, as they could be otherwise arranged—for instance, vertically, as shown in Figs. 4 and 5, which enables the coupling to be operated from the interior of the vehicle, as in the case of a wagon or a street-car, for instance, where the employee could ride on the vehicle, or it could be operated from the side of the vehicle by a horizontal shaft gearing with the vertical shaft. The springs I tend to maintain the coupling A B in the outward or operative position, while allowing it to be turned completely when required and allowing it to yield and snap into engagement with its corresponding coupling-piece on the adjacent vehicle, as before described.

It will be seen that by the present invention the coupling can be operated entirely without necessitating the employees getting between the vehicles, as in order to couple or uncouple vehicles which have been brought together it is only necessary to turn the coupling-pieces A B by means of the hand-wheel E to cause the hook of one vehicle to be coupled with or uncoupled from the link of the adjacent vehicle, as required, while when it is desired to effect the coupling automatically upon two vehicles meeting it is only necessary to see that the relative couplings are turned horizontally, with the hook on one vehicle and the link on the other in the outward or operative position ready to snap into engagement one with the other. After the coupling has been effected it may be rendered secure by shooting the bolt G into the notched disk F, as before described. Only one of the shafts C need be operated to work the coupling between each two vehicles.

Owing to the reversible character of the coupling-piece A B no delay need occur in the event of a hook or link breaking, as the parts need only be reversed to bring the other ends of the coupling-pieces into engagement until it is convenient to make the necessary repairs.

The coupling may be applied to any vehicle without interfering with existing construction and may be mounted in or secured to the usual spring draw-bar. As a means, however, of reducing vibration or oscillation, and thus rendering the coupling secure in action, the draw-bar is preferably provided with the arrangement of springs shown, in which one or more auxiliary or intermediary springs M are interposed between the inner ends of the draw-bars N. The draw-bars, which slide through the cross-pieces P P' of the frame, are connected with the couplings by means of the shanks O of the brackets D, said shanks sliding through the cross-piece P and being secured to the draw-bar N by a pin Q, this part of the draw-bar being strengthened to form an abutment R for the end spring S, which abuts with its other end against the cross-piece P. The intermediate springs M may be connected to the bar N by a cross-plate T, and an intermediary plate-spring or laminated spring U may also be provided for the plate T to bear against. By this arrangement of springs with intermediary or auxiliary springs a more or less progressive spring action may be attained by arranging the parts so that the springs M and U only come fully into action after the end springs S have taken up the first pull, the intermediary springs then taking up any increased pull or shock.

We declare that what we claim is—

1. A coupling for railway or other vehicles, comprising a coupling-piece having a hook at one end and a link at the other, and means for pivotally supporting the coupling-piece, so that it is capable of a complete revolution upon its axis, the structure being such that the coupling-piece is free to swing to one side or the other in the operation of coupling and uncoupling.

2. A coupling for railway and other vehicles, comprising a coupling-piece formed with a hook at one end and with an open link at the other end, and means for pivotally supporting the said hook so that it is capable of a complete revolution, said means also being adapted to turn the coupling-piece in either direction, when desired, so as to be brought into or out of operative position, substantially as described.

3. A coupling for railway and other vehicles, comprising a coupling-piece having one half formed as a hook and the other half as a link, means for pivotally mounting the said coupling-piece, and means for holding it in one position or another, the structure being such that the hook and link are free to swing to either side in coupling or uncoupling, substantially as described.

4. In means for coupling railway and similar vehicles, the combination of a coupling-piece having one half formed as a hook and the other half as a link, means for supporting said coupling-piece at the end of the vehicle, and for rotating it to bring either its hook or its link into or out of the operative position, means for holding it yieldingly in the position given to it and means for locking the coupling; substantially as described.

5. A car-coupler, comprising a coupling-piece formed with a hook at one end and a link at the other, means for pivotally supporting the same, comprising a shaft, brackets for supporting the said shaft, said shaft extending a suitable distance beyond the brackets so that it may be turned without going between cars for regulating the position of the coupling-piece, and means for yieldingly holding the coupling-piece in or out of coupling position, the construction being such that the meeting couplers when in coupling position may automatically pass by each other into locking engagement, substantially as described.

6. A car-coupler, comprising a coupling-piece formed with a hook and link at opposite ends, side brackets for supporting the same, a shaft carrying the said coupling-piece and finding bearings in said brackets, the said shaft extending to one side and provided with hand-operating means, a locking-disk on the said shaft, and a bolt adapted to engage the same, the structure being such that the coupling may be held in a yielding position for automatically coupling, and, after the coupling operation has taken place, may be positively locked in said position, substantially as described.

7. Means for coupling railway and similar vehicles, comprising a coupling-piece A, B, shaft C carrying same, means for revolubly supporting said shaft at the vehicle end, means for rotating said shaft and coupling-piece, cam-pieces L on said shaft, intermediate pivotal pieces K adapted to engage said cam-pieces, and springs adapted to bear on said pivotal pieces and maintain them in a vertical or normal position; in combination substantially as and for the purpose set forth.

8. A car-coupler, comprising a coupling-piece, side brackets supporting the same in position, a shaft for pivotally mounting the coupling-piece, cam-blocks secured to the said shaft, pivoted blocks engaging said cam-blocks, and springs for yieldingly holding the pivoted blocks in proper position, the structure being such that the coupling-piece will be held either in its coupling position or out of said position, substantially as described.

9. In a car-coupler, the combination of a revoluble coupling-piece, side brackets supporting the same, a block for holding the side brackets together, means for yieldingly connecting the side brackets to a car or other vehicle, a shaft supporting the revoluble coupling-piece, cam-blocks carried by the said shafts and provided with projections arranged upon the longitudinal and transverse axes of the coupling-piece, pivoted pieces having V-shaped recesses, the said pieces being thus adapted to engage the cam-blocks, studs or projections upon the side brackets, springs interposed between the studs or projections and the pivoted pieces, whereby the coupler will be yieldingly held in its various positions, substantially as described.

In witness whereof we have hereunto signed our names, this 7th day of October, 1899, in the presence of two subscribing witnesses.

CHARLES HENRY BAGOT.
DAVID DISHART.

Witnesses:
ALBERT C. B. HENRI,
WILLIAM G. TRAVIS.